May 21, 1935.  E. EGER  2,001,777
TUBE INFLATING MACHINE
Filed Nov. 29, 1932  2 Sheets-Sheet 1
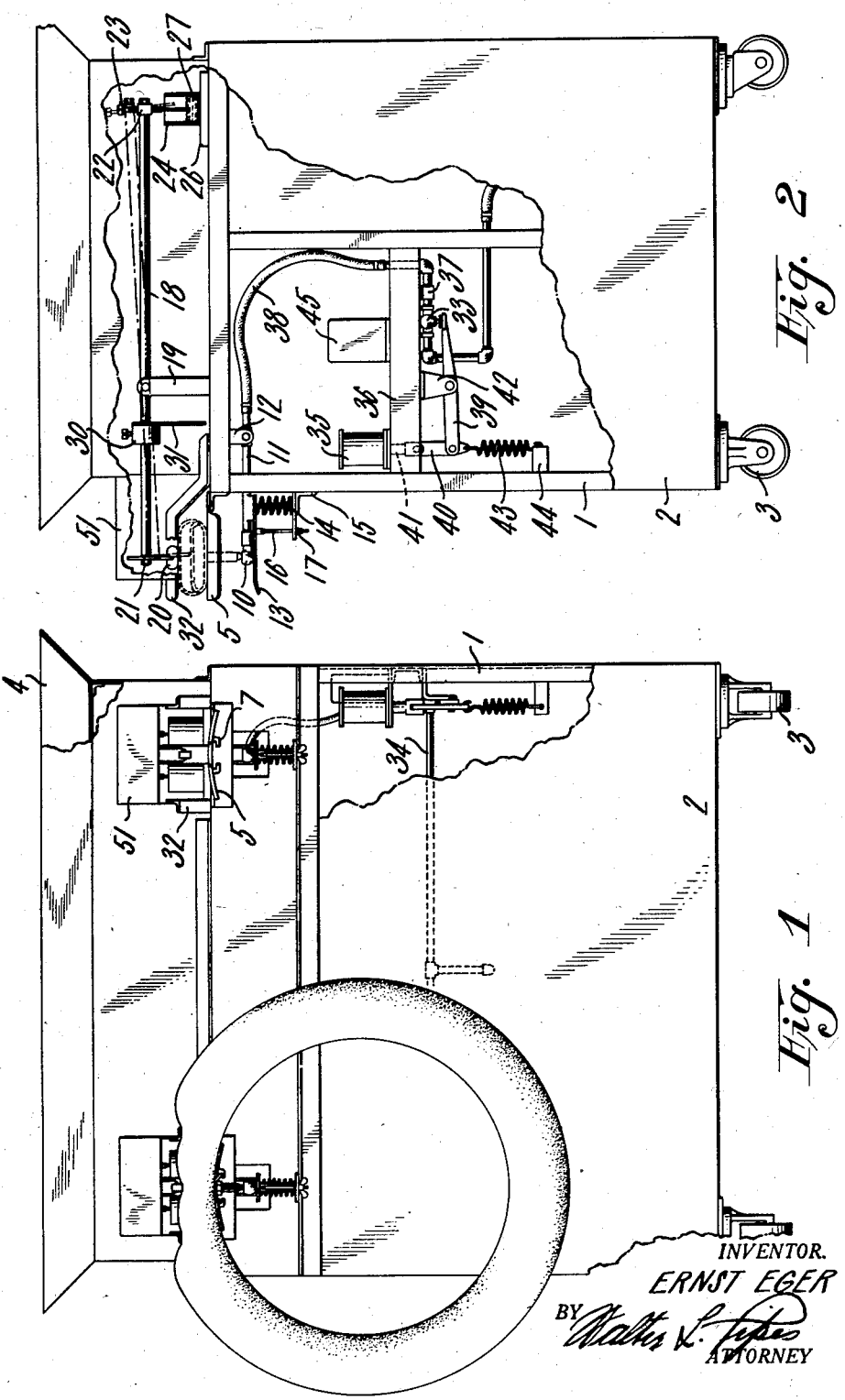
INVENTOR.
ERNST EGER
BY
ATTORNEY May 21, 1935. E. EGER 2,001,777
TUBE INFLATING MACHINE
Filed Nov. 29, 1932 2 Sheets-Sheet 2
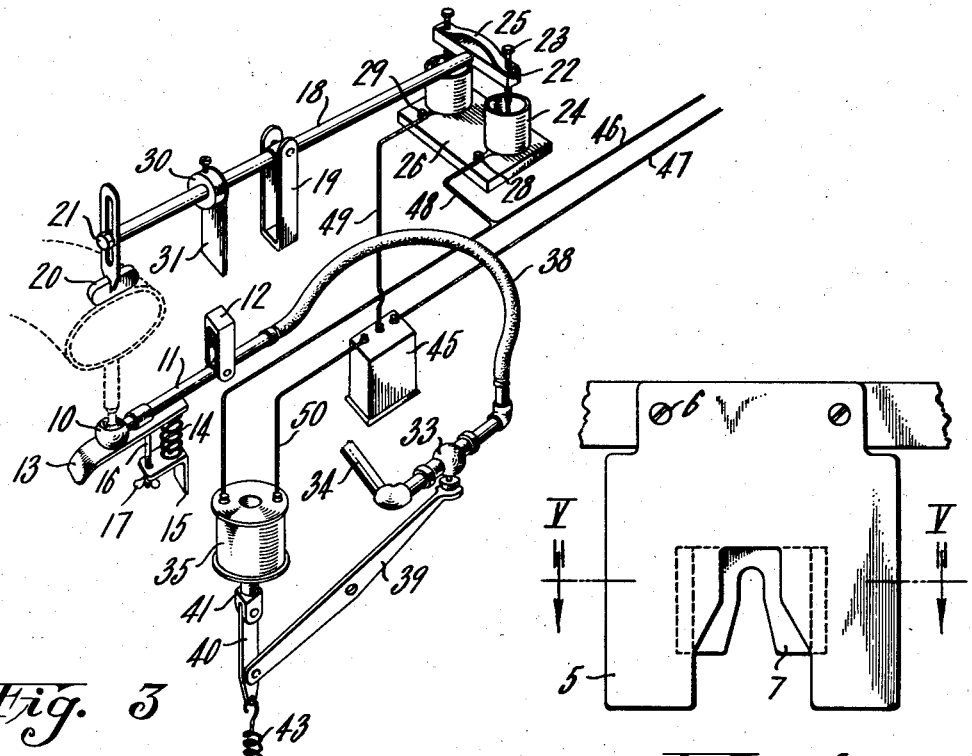
Fig. 3
Fig. 4
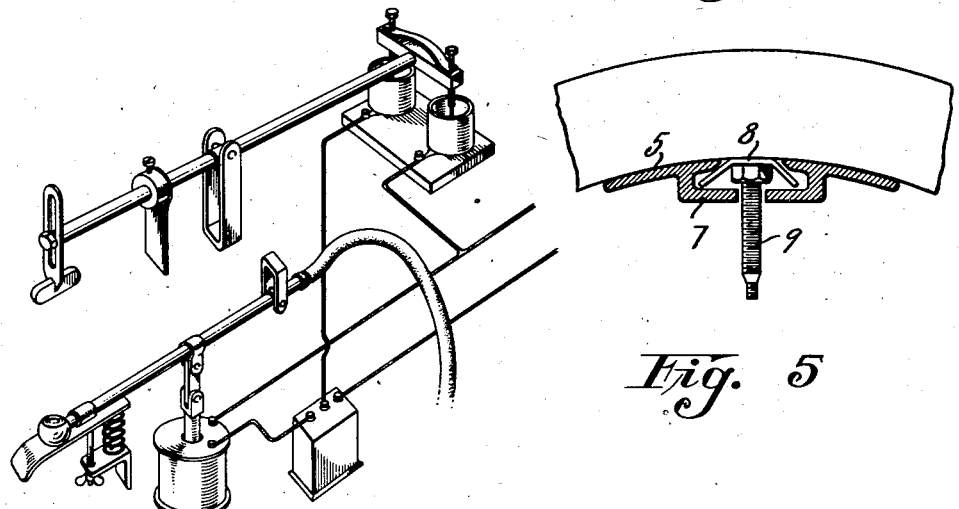
Fig. 5
Fig. 6
INVENTOR.
ERNST EGER
BY
ATTORNEY Patented May 21, 1935

2,001,777

UNITED STATES PATENT OFFICE 2,001,777

TUBE INFLATING MACHINE

Ernst Eger, Grosse Pointe Park, Mich., assignor, by mesne assignments, to United States Rubber Company, New York, N. Y., a corporation of New Jersey Application November 29, 1932, Serial No. 644,790

3 Claims. (Cl. 152—11)

The machine forming the subject matter of this invention has for its purpose to inflate inner tubes to a predetermined pressure prior to assembling the tubes within tire casings.

In general, it consists of means for holding the tube with the valve stem in alignment with an air chuck, and means determinable on the swelling of the tube to operate electric contacts which in turn actuate a solenoid or magnet for closing or opening a valve leading to the air chuck.

In the course of tire manufacture it is frequently necessary to send out large shipments of assembled tires and tubes. Tubes assembled in this way are required to be sufficiently inflated so that the tube will be rigid enough to support its own annular form. To accomplish this operation, it heretofore has been generally customary for an operator to apply an air supply chuck to the valve stem of the tube and inflate the tube to such a degree as his discretion would dictate. As a result the tubes were inflated in various degrees. This lack of uniformity caused inconvenience in inserting the tube within the tire casing. The machine of the present invention overcomes these objectionable features and provides means for inflating tubes which is expeditious in operation and uniform in its resulting treatment of the tubes.

The invention is illustrated in the accompanying drawings, in which:

Figure 1 is a front elevation of the complete machine, partly broken away to illustrate the interior;

Fig. 2 is a side view of the machine, also partly broken away to illustrate the interior;

Fig. 3 shows a diagrammatic perspective view of the working elements of the machine;

Fig. 4 illustrates a plan view of the tube assembly engaging means;

Fig. 5 is a section of the tube assembly engaging means, taken along lines V—V of Fig. 4; and Fig. 6 is a diagrammatic perspective view of a modified arrangement of the working elements applicable to the machine.

In the machine as illustrated, two inflating units are shown. These units are separate and operate independently of each other. Therefore, in the description one unit only will be described. The purpose of incorporating the two units on one machine is so that one operator may engage a tube with one inflating unit, and while the air is passing into the tube he can engage a tube with the second unit. In this way tubes can be inflated as fast as they can be engaged and disengaged with the inflating machine.

Referring to Figs. 1 and 2, the machine comprises a box-like framework of structural members 1 encased in a covering of sheet material 2. Casters 3 convert the machine into a portable arrangement so that it may be moved about for the convenience of the operator and according to the location of stock with which it operates. On top of the framework, the sheet material diverges to form a large tray 4 on which the deflated tubes may be stored within reach of an operator.

A shelf 5 (Figs. 4 and 5) fastened to the framework by screws 6 extends from the machine and acts as a support from which the tube is suspended. The shelf is slotted so that the valve stem assembly may extend downward. Beneath the shelf, bracket-like members 7 form with the shelf a slideway into which the bridge washer 8 of the tube valve assembly is slidable. This arrangement restricts upward or downward movement of the valve assembly but at the same time its loose end movement in the slideway allows quick engagement and disengagement with the tube supporting means.

When the tube is thus held by the engaging means, the valve stem 9 comes into alignment with an air chuck 10 having a chuck valve therein which is opened by the pressure exerted by a valve stem. This chuck connects with a pipe 11 pivoted to a bracket 12 attached to the framework. A plate 13 fastened to the pipe 11 extends outward beyond the chuck for the purpose of providing a lever-like control so that the operator can press same to lower the chuck when the tube is being inserted. After the tube is inserted into the engaging means the operator releases the lever-like plate and the chuck then in alignment with the valve stem contacts with same in operative engagement. A spring 14 interposed between the plate 13 and a bracket 15, attached to the framework, provides upward tension of the air chuck, while a stud 16 and wing nut 17 restrict its upward movement.

As the tube becomes inflated its cross section expands, operating a tilting rod 18 which controls electrical contacts, the operation of which results in closing the valve through which air is supplied to the tube. The rod 18 is pivotally supported by a bracket 19 and contains at one end an adjustable tube contact member 20 fastened to the rod 18 by a screw 21. The opposite end of the rod terminates with a horizontal crosspiece 22 made of electrical insulating material. At the ends of this crosspiece vertical screws 23 are disposed in alignment with cups 24. A spring strip 25 bears against the screws 23 and completes an electrical path between the two screws. The cups 24 are mounted on an insulated board 26 and are partly filled with mercury 27. Terminals 28 and 29 electrically join with the cups. It is to be understood that other types of circuit completing and interrupting devices may be substituted for the mercury cups here illustrated. A weight 30 adjustable along the rod 18 between the bracket 19 and tube contact member 20 provides means for controlling the amount of pressure desired within the tube. A stop 31 extending downward from the weight strikes the framework and restricts the downward movement of the tube contact member so as to provide sufficient clearance for the insertion of the deflated tube thereunder.

Angle arms 32 extend from the framework and are positioned on each side of the tube contact member at a height from the shelf 5 about sufficient to measure the proper inflating cross sectional distance. The purpose for these arms is to prevent the tube from inflating, at this point, into a circular cross section and to force it to inflate into a more horizontal cross section. The result is that a greater uniformity can be attained, for the ounces of pressure within the tube are kept more constant, and local abnormal swelling of the tube at this point is greatly minimized. The sheet covering 51, which encloses the end of rod 18 and the tube contact member 20, acts as a protective means for these elements.

A valve 33 connected to a source of fluid pressure by pipe line 34, preferably but not necessarily connected to a source of fluid pressure external to the machine, is controlled by actuation of a solenoid or magnet 35. This valve is fastened to the frame member 36 by bracket 37. A flexible hose 38 connects the valve with the air chuck pipe 11. The connection between the valve and the solenoid comprises a lever 39 pivotally connected to a link 40 hinged to the plunger 41. The lever 39 is also pivoted to a bracket 42 fastened to the frame member 36. A spring 43 attaches the link 40 to a bracket 44 extending from the framework to hold the valve 33 open during the time the solenoid remains in an inactive state.

A relay switch 45 intercepts the wiring connection between the mercury cup contacts and the solenoid, so that the burden of the load current will be assumed by the relay instead of by the sensitive mercury contact switch. Wires 46 and 47 extend to a source of electricity and connect with the solenoid 35 and relay 45 respectively. Wire 48 joins wire 46 with the terminal 28, from which the circuit continues through the mercury contact switch to terminal 29, thence to the relay 45 through wire 49. From the relay 45 the wire 50 extends to the wire 47 through the solenoid 35.

In the operation of the device, a tube is inserted into the engaging means 5 and the valve stem contacts with the air chuck 10. Immediately the tube begins to inflate. Upon nearing the proper inflation the expanding tube engages the tube contact member 20, causing the tilting rod 18 to move about its pivot. This lowers the contact screws in the mercury cups 24. When the tube is properly expanded the mercury contact switch closes and current is transmitted to the relay 45 closing the circuit of the solenoid 35. The solenoid plunger 41 is drawn upward, lever 39 releases a push button of valve 33 and a spring within the valve shuts off the air supply. The elements remain in this state or position until the tube is removed. When this takes place the tilting rod 18 assumes its inactive position, the circuit is broken, and spring 43 through the lever 39 opens valve 33 in readiness for the next tube to be applied.

The modification illustrated by Fig. 6 operates in substantially the same manner except that the valve 33 is omitted and the solenoid plunger operates from the top of the solenoid to pull the air chuck down and away from the valve stem when the proper inflation is obtained. Escape of air when the chuck is pulled down is prevented by the usual valve in the chuck 10.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. Inflating mechanism for an assembled tube and valve stem comprising means for clamping a valve stem, spaced means disposed adjacent to the clamping means for limiting the local inflation of the tube, and means for engaging the tube intermediate the spaced limiting means for controlling the supply of fluid to the tube.

2. Inflating mechanism for an assembled tube and valve stem, comprising means for clamping a valve stem, means disposed adjacent to the clamping means for limiting the local inflation of the tube, and means for engaging the tube within the area controlled by the limiting means for controlling the supply of fluid to the tube.

3. Inflating mechanism for assembled tubes, valve stems and bridge washers comprising a clamp having pairs of spaced overhanging brackets defining an open-faced pocket for the insertion of a bridge washer, the space between one pair of brackets defining a slot for the insertion and removal of a valve stem, and the space between the other pair of brackets defining a space for the insertion and removal of the base of the valve stem and portions of the tube.

ERNST EGER.